(12) United States Patent
Murai et al.

(10) Patent No.: US 8,823,684 B2
(45) Date of Patent: Sep. 2, 2014

(54) POSITION DETECTION SYSTEM, DISPLAY PANEL, AND DISPLAY DEVICE

(75) Inventors: Atsuhito Murai, Osaka (JP); Takehiro Murao, Osaka (JP); Seishi Kosegawa, Osaka (JP); Yukihiko Nishiyama, Osaka (JP); Hideki Kitagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 189 days.

(21) Appl. No.: 13/505,600

(22) PCT Filed: Jun. 29, 2010

(86) PCT No.: PCT/JP2010/061015
§ 371 (c)(1),
(2), (4) Date: Jun. 7, 2012

(87) PCT Pub. No.: WO2011/055567
PCT Pub. Date: May 12, 2011

(65) Prior Publication Data
US 2012/0280940 A1    Nov. 8, 2012

(30) Foreign Application Priority Data

Nov. 5, 2009  (JP) ................ 2009-253943

(51) Int. Cl.
*G06F 3/042*     (2006.01)
*G06F 3/041*     (2006.01)

(52) U.S. Cl.
CPC ............ *G06F 3/0421* (2013.01); *G06F 3/0412* (2013.01); *G06F 3/0428* (2013.01)
USPC ........... 345/175; 345/176; 345/179; 345/104; 356/152

(58) Field of Classification Search
CPC ..... G06F 3/0421; G06F 3/0412; G06F 3/042; G06F 3/03545; G06F 3/0317
USPC ............................. 345/17–176, 179; 356/152
See application file for complete search history.

(56) References Cited

U.S. PATENT DOCUMENTS 6,351,260 B1 *  2/2002  Graham et al. ............... 345/179
2005/0093466 A1  5/2005  Matsumoto

FOREIGN PATENT DOCUMENTS

| JP | 2004-303172 A | 10/2004 |
| JP | 2005-107890 A | 4/2005 |
| JP | 2005-316517 A | 11/2005 |
| JP | 2008-217819 A | 9/2008 |

* cited by examiner

*Primary Examiner* — Shaheda Abdin
(74) *Attorney, Agent, or Firm* — Chen Yoshimura LLP

(57) ABSTRACT

Disclosed are: a position detection system having improved flexibility in selection of line sensors; and others. In the position detection system (PM) of the present invention, a phosphor (11) which can excite invisible light (UV light) that is light emitted from an LED (23) is arranged on an optical path between the LED (23) and a light receiving element (26).

12 Claims, 10 Drawing Sheets

POSITION DETECTION SYSTEM, DISPLAY PANEL, AND DISPLAY DEVICE

TECHNICAL FIELD

The present invention relates to a position detection system that detects the position of an object, to a display panel (such as a liquid crystal display panel) provided with a position detection system, and further to a display device (such as a liquid crystal display device) provided with a display panel.

BACKGROUND ART

In recent years, various devices have been provided with a so-called touch panel (a display panel provided with a position detection system). Along with this trend, development of touch panels has also been advanced (Patent Document 1, for example). When a position detection system provided in such touch panels employs a relatively simple optical detection system, the structures illustrated in partial cross-sectional views of FIG. 12 or FIG. 13 are often used.

For example, a position detection system "pm" of FIG. 12 includes an LED (Light Emitting Diode) group 122 in which a plurality of LEDs 123 are arranged, and a line sensor 125 in which light receiving elements 126 are arranged. The position detection system "pm" identifies the position of an object such as a finger in accordance with a shadow of the object positioned between the LEDs (light sources) 123 and the line sensor 125. In other words, the position of the object is identified by whether the line sensor 125 receives light or not (whether a semiconductor included in the light receiving elements 126 of the line sensor 125 generates a reverse bias current by photoelectric conversion or not).

For this reason, it is desirable that the LEDs 123 emit light of a wavelength in which the semiconductor (photoelectric conversion body) included in the line sensor 125 is most likely to generate a reverse bias current. However, if light of the wavelength is visible light, it may possibly be seen by a user. Accordingly, the light sources in the position detection system of Patent Document 1 emit infrared light, which is invisible light.

RELATED ART DOCUMENTS

Patent Documents

Patent Document 1: Japanese Patent Application Laid-Open Publication No. 2008-217819

SUMMARY OF THE INVENTION

Problems to be Solved by the Invention

However, when such a light source emitting infrared light is used, it is necessary for the light receiving element 126 to include a semiconductor that generates a reverse bias current efficiently by receiving infrared light. Such a semiconductor is a single-crystalline silicon semiconductor, for example. However, that silicon semiconductor is relatively expensive, and moreover its photoelectric conversion function is inferior to an amorphous silicon semiconductor, for example.

For this reason, one may attempt to use an amorphous silicon semiconductor for light receiving element 126 of the line sensor 125, however, amorphous silicon semiconductor generates a reverse bias current most efficiently when it receives visible light (a wavelength of approximately 540 nm). Accordingly, when the line sensors 125 of the position detection systems "pm" illustrated in FIGS. 12 and 13 are used, visible light is seen by a user, and therefore, it is difficult to use a light receiving element that includes an amorphous silicon semiconductor. Thus, when light of the LEDs 123 is invisible light, selection (flexibility) for the line sensor 125 is limited.

The present invention was devised in order to solve the above-mentioned problems. An object of the present invention is to provide a position detection system or the like that has an improved flexibility in selection of the line sensor.

Means for Solving the Problems

A position detection system of the present invention is a position detection system that uses a shadow of an object to detect a position of the object, including: a light source group including light sources that emit light onto the object; a light receiving sensor in which light receiving elements that measure a light intensity distribution of the light, which has been changed by a shadow generated by the object, are arranged; and a phosphor that fluoresces in response to invisible light, which is the above-mentioned light, arranged on an optical path of the light of the light source to the light receiving element.

According to this configuration, invisible light emitted from the light sources is converted by the phosphor into light of a wavelength suitable for the light receiving elements, and therefore, light for detecting the position of the object becomes invisible to a user. Moreover, because the phosphor that received invisible light fluoresces (emits visible light, for example), it is possible to use a light receiving sensor that cannot function well by receiving invisible light. In other words, there will be more flexibility in selection of the light receiving sensor.

Moreover, the present invention is the position detection system of the above-mentioned configuration, wherein the phosphor emits by fluorescence, in response to the light received, light of a second wavelength that is different from light of a first wavelength, at which a photoelectric conversion body included in the light receiving element generates a largest reverse bias current upon light reception. Also in the position detection system including such a phosphor, the photoelectric conversion body satisfies condition formulas A to C below.

$$RCR1 = 1 - Ce1/Cs1 \qquad \text{Condition formula A}$$

$$RCR2 = 1 - Ce2/Cs2 \qquad \text{Condition formula B}$$

$$RCR1 > RCR2 \qquad \text{Condition formula C}$$

where,

Cs1: a reverse bias current that the photoelectric conversion body initially generates when it receives light of the first wavelength Ce1: a reverse bias current that the photoelectric conversion body generates a prescribed period of time after it has received light of the first wavelength RCR1: a characteristic change rate of the photoelectric conversion body calculated using Cs1 and Ce1 when the photoelectric conversion body receives light of the first wavelength Cs2: a reverse bias current that the photoelectric conversion body initially generates when it receives light of the second wavelength Ce2: a reverse bias current that the photoelectric conversion body generates a prescribed period of time after it has received light of the second wavelength RCR2: a characteristic change rate of the photoelectric conversion body calculated using Cs2 and Ce2 when the photoelectric conversion body receives light of the second wavelength The characteristic change rate indicates how much reverse bias current the photoelectric conversion body can generate after it has been receiving light for a prescribed period of time as compared to the amount of a reverse bias current that the photoelectric conversion body initially generated immediately after it receives the light. With this configuration, the photoelectric conversion body in the light receiving element receives light that results in a relatively low characteristic change rate. Therefore, the light receiving element can perform photoelectric conversion over a relatively long period of time. As a result, this position detection system is not likely to cause a problem such as an inability to perform photoelectric conversion, and therefore, the reliability can be increased.

It is preferable that the present invention be the position detection system of the above-mentioned configuration, wherein the light source emits ultraviolet light, wherein the phosphor is a red phosphor that emits red light through fluorescence in response to the ultraviolet light, and wherein the photoelectric conversion body is a semiconductor including amorphous silicon.

It is preferable that the present invention be the position detection system of the above-mentioned configuration, wherein the light receiving sensor includes a light receiving element having the photoelectric conversion body, and a sensor substrate having wiring (sensor circuit) for extracting a reverse bias current generated by the photoelectric conversion body to an exterior as a sensor output.

According to this configuration, handling of the light receiving sensor becomes easy because the light receiving sensor has a plurality of light receiving elements on a single sensor substrate.

It is preferable that the present invention be the position detection system of the above-mentioned configuration, wherein the light source group is disposed on a base substrate that serves as a base.

According to this configuration, handling of the position detection system becomes easy because the position detection system has a plurality of light sources (that is, a light source group) disposed on a single base substrate.

It is preferable that the present invention be the position detection system of the above-mentioned configuration, including a refractive optical element that refracts light from the light source and guides the light to the light receiving element, wherein the refractive optical element is disposed on a base substrate.

According to this configuration, when light from the light sources travel along a substrate surface of the base substrate, this light is refracted by the refractive optical element. Therefore, the sensor substrate of the light receiving sensor can be disposed along a surface direction of the substrate surface of the base substrate, for example. This way, the mounting substrate does not protrude from the substrate surface of the base substrate, and the thickness of the position detection system is reduced.

It is preferable that the present invention be the position detection system of the above-mentioned configuration, wherein the light receiving sensor includes the light receiving element having the photoelectric conversion body, and a sensor substrate having wiring (sensor circuit) for extracting a reverse bias current generated by the photoelectric conversion body to an exterior as a sensor output, and wherein the light receiving element and the wiring are disposed on a base substrate so that the base substrate also serves as the light receiving sensor.

According to this configuration, the position detection system can have a smaller number of substrates. This reduces the cost of the position detection system as well.

It is preferable that the present invention be the position detection system of the above-mentioned configuration, wherein the phosphor is disposed on the sensor substrate along with the photoelectric conversion body, and covers the photoelectric conversion body.

According to this configuration, the phosphor is also disposed on the sensor substrate along with the photoelectric conversion body, and therefore, handling of the phosphor becomes easy as well.

A display panel provided with the above-mentioned position detection system is also the present invention. Furthermore, it was described above that the light receiving sensor includes the light receiving element having the photoelectric conversion body, and a sensor substrate in which wiring (sensor circuit) for extracting a reverse bias current generated by the photoelectric conversion body to the outside as a sensor output is arranged, however, the light receiving element and the wiring may be disposed on a panel substrate included in the display panel so that the panel substrate also serves as the light receiving sensor. This way, the number of substrates is reduced, and the cost of the position detection system and thus the cost of the display panel can be reduced.

It is preferable that the present invention be the position detection system of the above-mentioned configuration, wherein the phosphor is disposed on the panel substrate, which also serves as the sensor substrate along with the photoelectric conversion body, and covers the photoelectric conversion body. Here, the phosphor may also be disposed on the base substrate. Moreover, a display device provided with the above-mentioned display panel is also the present invention.

Effects of the Invention

According to the position detection system of the present invention, even when light from a light source and a light receiving sensor are incompatible (that is, a light receiving sensor cannot generate a reverse bias current effectively in response to received light from the light source), invisible light emitted from the light source can be converted by a phosphor into light suitable for the light receiving sensor. Therefore, even though light of the light source is invisible light, it is possible to use a light receiving sensor suitable for visible light. Accordingly, there will be more flexibility in selection of the light receiving sensor used in the position detection system.

DETAILED DESCRIPTION OF EMBODIMENTS

Embodiment 1

An embodiment is described below with reference to figures. Here, hatchings, member characters, and the like may be omitted for convenience, but in such cases, other figures should be referred to. Moreover, hatchings may be used for a figure other than a cross-sectional view for convenience. Here, white arrows in the figures represent light.

Figure 1:
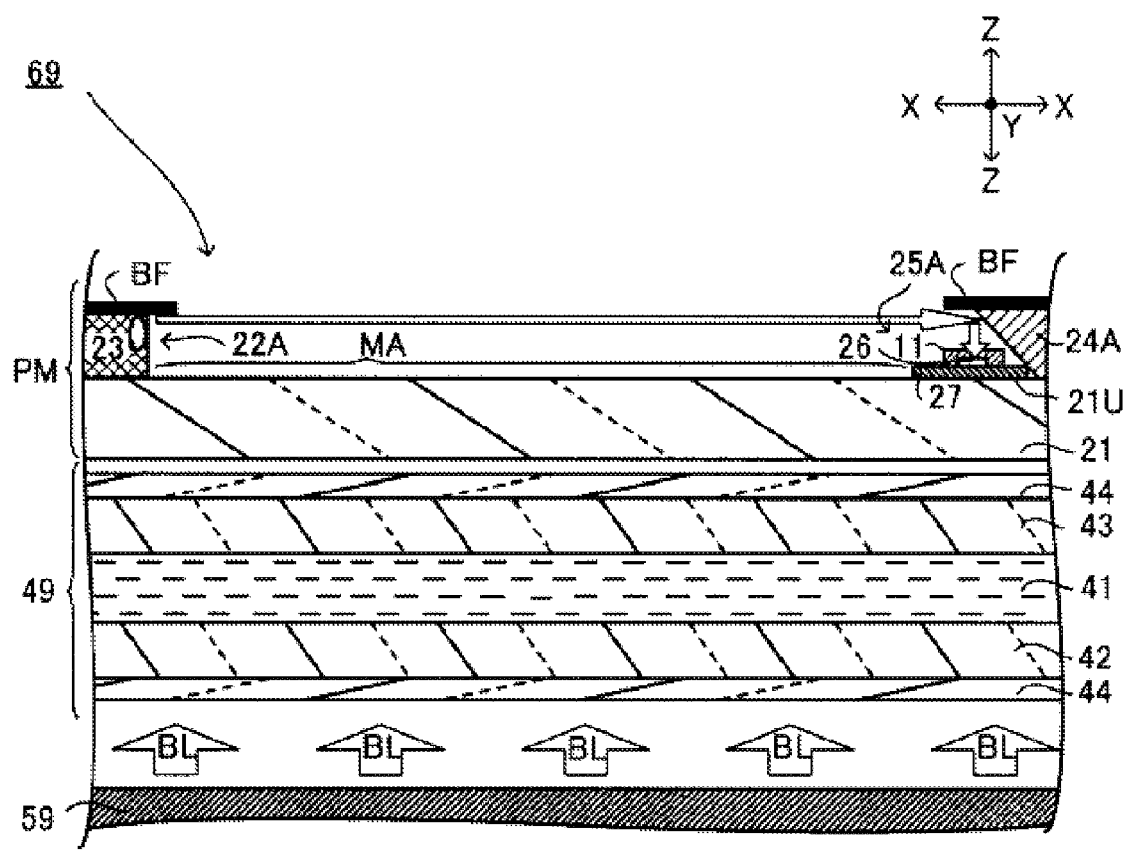
FIG. 1 is a partial cross-sectional view of a liquid crystal display device.

FIG. 1 is a partial cross-sectional view of a liquid crystal display device (display device) 69. As shown in this figure, the liquid crystal display device 69 includes a backlight unit (illumination device) 59 and a liquid crystal display panel (display panel) 49.

The backlight unit 59 is an illumination device provided with light sources such as LEDs (Light Emitting Diodes) or fluorescent tubes, for example, and emits light (backlight light BL) onto the liquid crystal display panel 49, which is a non light-emitting display panel.

The liquid crystal display panel 49, which receives light, includes an active matrix substrate (panel substrate) 42 and an opposite substrate 43 that are sandwiching liquid crystal 41. In the active matrix substrate 42, although not shown in the figure, gate signal lines and source signal lines are disposed so as to be perpendicular to each other, and a switching element (Thin Film Transistor, for example), which is required for adjusting a voltage applied to the liquid crystal (liquid crystal layer) 41, is further disposed at each intersection of these two types of signal lines.

Moreover, a polarizing film 44 is attached to a light receiving side of the active matrix substrate 42 and to an emitting side of the opposite substrate 43. The above-mentioned liquid crystal display panel 49 displays images by using the changes in light transmittance caused by inclinations of the liquid crystal molecules 41 reacting to an applied voltage.

This liquid crystal display panel 49 is also provided with a position detection system "PM" (the liquid crystal display panel 49 provided with this position detection system PM may also be referred to as a touch panel 49). This position detection system PM is a system that detects where a finger or the like is positioned on the liquid crystal display panel 49.

Figure 2:
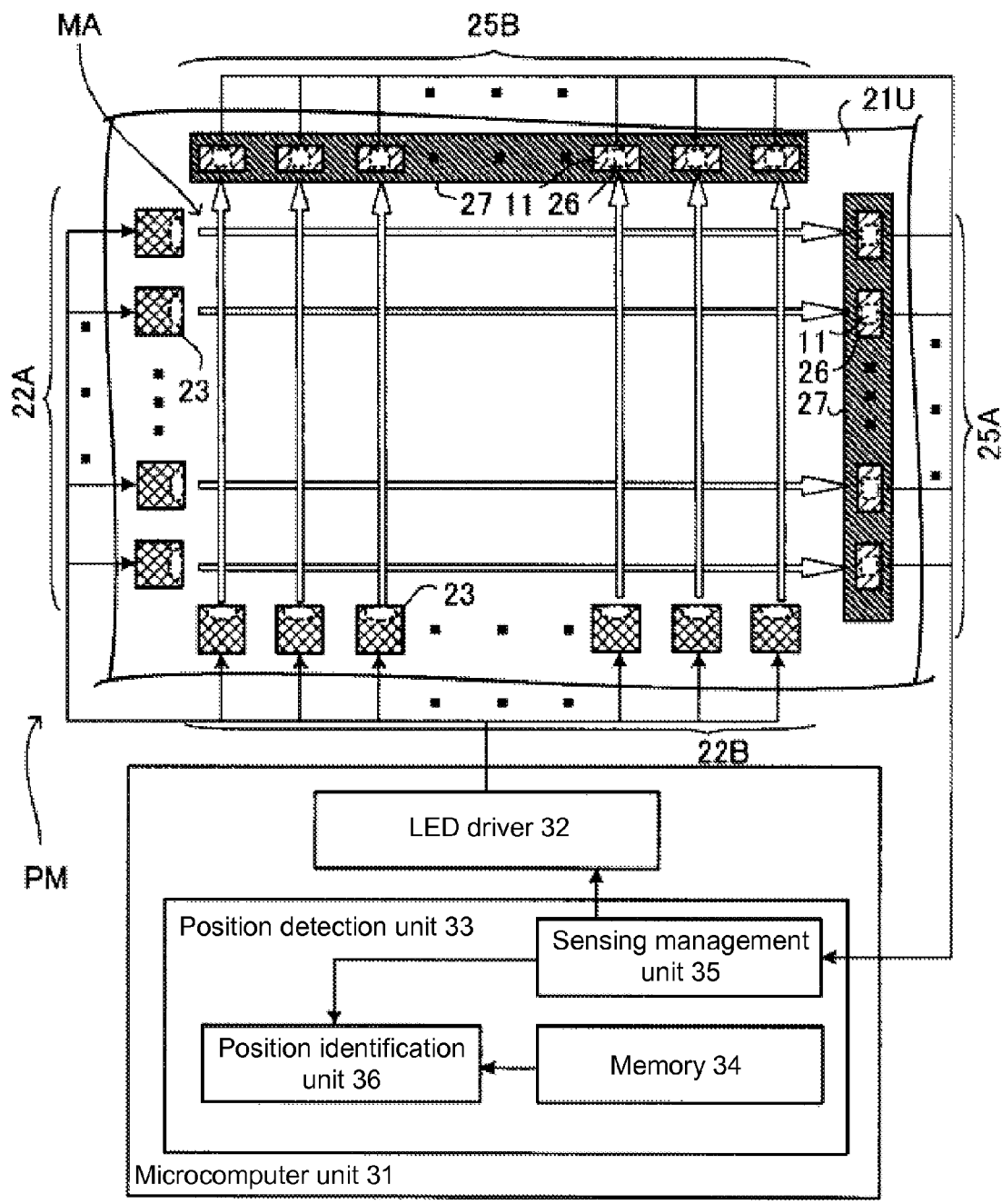
FIG. 2 is an explanatory view showing both a plan view of a position detection system, and a block diagram of a microcomputer unit required for controlling this position detection system.
Figure 3:
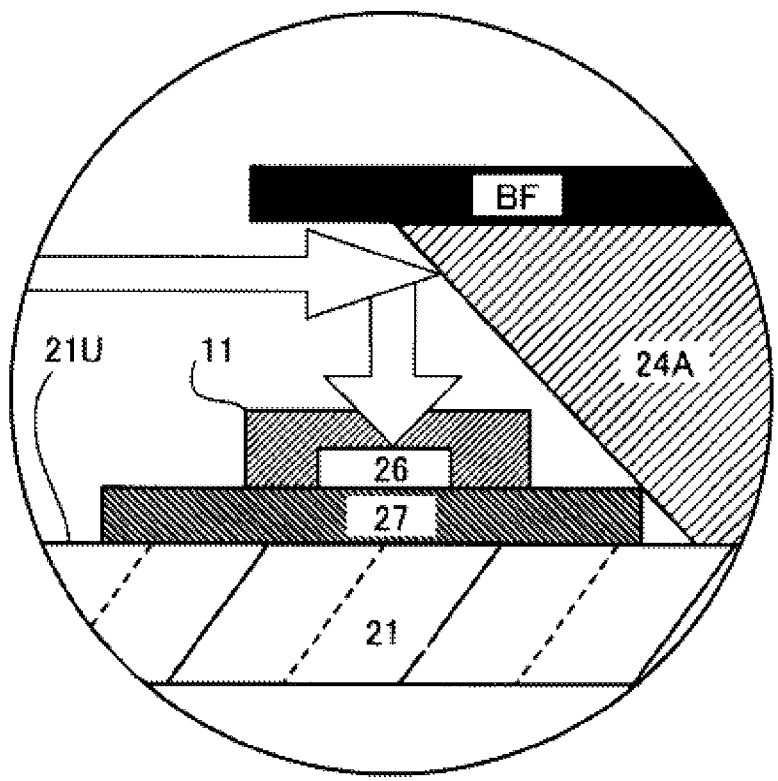
FIG. 3 is a partial enlarged view of the position detection system shown in FIG. 1.

Here, this position detection system PM is described in detail with reference to FIGS. 1 to 3. FIG. 2 is an explanatory view showing both a plan view of the position detection system PM, and a block diagram of a microcomputer unit 31 required for controlling this position detection system PM (here in FIG. 2, a reflective mirror 24, a light-shielding body BF and the like, which will be described later, are omitted for convenience). FIG. 3 is a partial enlarged view of the position detection system PM shown in FIG. 1.

The position detection system PM includes a protective substrate (base substrate) 21, LED groups (light source groups) 22, reflective mirrors (refractive optical elements) 24, line sensors (light receiving sensors) 25, and a microcomputer unit 31 (here, the reflective mirror 24 is an example, and a refractive optical element such as a prism may also be used).

The protective substrate 21 is a substrate with insulating characteristics that covers the opposite substrate 43 (the polarizing film 44 on the opposite substrate 43 to be specific) in the liquid crystal display panel 49. Having this protective substrate 21 interposed between an object such as a finger and the display surface, the protective substrate 21 protects the liquid crystal display panel 49 from a scratch or the like, which could be caused when an object such as a finger is placed on the display surface side of the liquid crystal display panel 49.

On this protective substrate 21, the LED groups 22, the reflective mirrors 24, and the line sensors 25 are disposed. In other words, this protective substrate 21 supports various members of the position detection system PM. For this reason, it can be said that the protective substrate 21 is the base of the position detection system PM.

Each of the LED groups 22 (22A and 22B) is a group of a plurality of ultraviolet light emitting LEDs (light sources) 23 arranged in a line. The two LED groups 22 (22A and 22B) are positioned on the protective substrate 21 so as to be perpendicular to each other like an L-shape, and the LED group 22A emits light along the lineup direction of the LED group 22B, and the LED group 22B emits light along the lineup direction of the LED group 22A. This way, light spreads throughout an area on inner sides of the LED groups 22A and 22B arranged in an L-shape (here, because ultraviolet light is invisible light, it is not seen by a user).

The reflective mirrors 24 (24A and 24B) reflect light from the LEDs 23, and have a linear reflective surface. The reflective mirror 24A has its reflective surface along the direction in which the LED group 22A extends (the direction in which the LEDs 23 are arranged in the LED group 22A), and the reflective mirror 24B has its reflective surface along the direction in which the LED group 22B extends (the direction in which the LEDs 23 are arranged in the LED group 22B). Specifically, the linear-shaped reflective mirror 24A faces the extending direction of the LED group 22A in a parallel manner, and the linear-shaped reflective mirror 24B faces the extending direction of the LED group 22B in a parallel manner.

Moreover, the total length of the reflective mirror 24A is approximately same as the total length of the LED group 22A, and the total length of the reflective mirror 24B is approximately same as the total length of the LED group 22B. The distance between the reflective mirror 24A and the LED group 22A facing each other is approximately same as the total length of the LED group 22B, and the distance between the reflective mirror 24B and the LED group 22B facing each other is approximately same as the total length of the LED group 22A. This way, a square area enclosed by the reflective mirrors 24A and 24B and the LED groups 22A and 22B is generated.

As a result, light spreads throughout a square area, which is an area on inner sides of the LED groups 22A and 22B arranged in an L-shape as well as an area enclosed by the LED groups 22A and 22B and the reflective mirrors 24A and 24B. Further, a reflective surface of the reflective mirrors 24 is inclined toward a substrate surface 21U of the protective substrate 21, and therefore, light from the LED groups 22 is reflected and guided to the substrate surface 21U.

It is preferable that a light-shielding body BF be attached to the reflective mirrors 24 and the LEDs 23 to suppress light leakage to the outside. For example, as shown in FIG. 1, it is preferable that the light-shielding body BF be attached to the outer surface of the reflective mirrors 24 facing the outside and to the outer surface of the LEDs 23 facing the outside.

Each of the line sensors 25 (25A and 25B) includes, as shown in FIG. 2, a plurality of light receiving elements (such as photo diodes) 26 arranged in a line, and a mounting substrate (sensor substrate) 27 on which wiring and the like for a sensor circuit are disposed. Each of the light receiving elements 26 includes a semiconductor that performs photoelectric conversion (a photoelectric conversion body), and a phosphor 11 is additionally disposed so as to cover a light receiving surface of the light receiving element 26, but they will be described later in detail.

The line sensor 25A is disposed directly below an inclined reflective surface of the reflective mirror 24A such that the back surface of the mounting substrate 27 faces the substrate surface 21U of the protective substrate 21, and the line sensor 25B is disposed directly below an inclined reflective surface of the reflective mirror 24B such that the back surface of the mounting substrate 27 faces the substrate surface 21U of the protective substrate 21. This way, the light receiving elements 26 of the line sensors 25 receive light reflected by the reflective mirrors 24 through the phosphors 11 (and the position of an object such as a finger in a coordinate map area MA, which will be described later, is identified in accordance with this light reception data).

An area enclosed by the line sensors 25 (or the reflective mirrors 24) and the LED groups 22 on the substrate surface 21U of the protective substrate 21 is defined as a coordinate map area MA. Here, the extending direction of the LED group 22B, which has a longer total length, of the LED groups 22 is referred to as the X direction, the extending direction of the LED group 22A, which has a shorter total length, is referred to as the Y direction, and a direction crossing (such as perpendicular to) the X direction and the Y direction is referred to as Z direction.

The microcomputer unit 31 controls the position detection system PM, and includes an LED driver 32 and a position detection unit 33.

The LED driver 32 is a driver that supplies an operating current to the LEDs 23 of the LED groups 22.

The position detection unit 33 includes a memory 34, a sensing management unit 35, and a position identification unit 36.

When an object such as a finger is placed on the coordinate map area MA, the memory 34 stores the coordinate map area MA to identify the position of the finger or the like. Coordinate positions in the coordinate map area MA are defined by the number of light receiving elements 26 embedded in the line sensors 25 (25A and 25B), for example.

For example, m units of the light receiving elements 26 are included in the line sensor 25B, and n units of the light receiving elements 26 are included in the line sensor 25A (here, both m and n are plural integers). Then, an area of the light receiving elements 26 capable of receiving light is constituted of the areas in which the X direction of the coordinate map area MA is divided into m units along the Y direction, and the areas in which the Y direction of the coordinate map area MA is divided into n units along the X direction.

Figure 4:
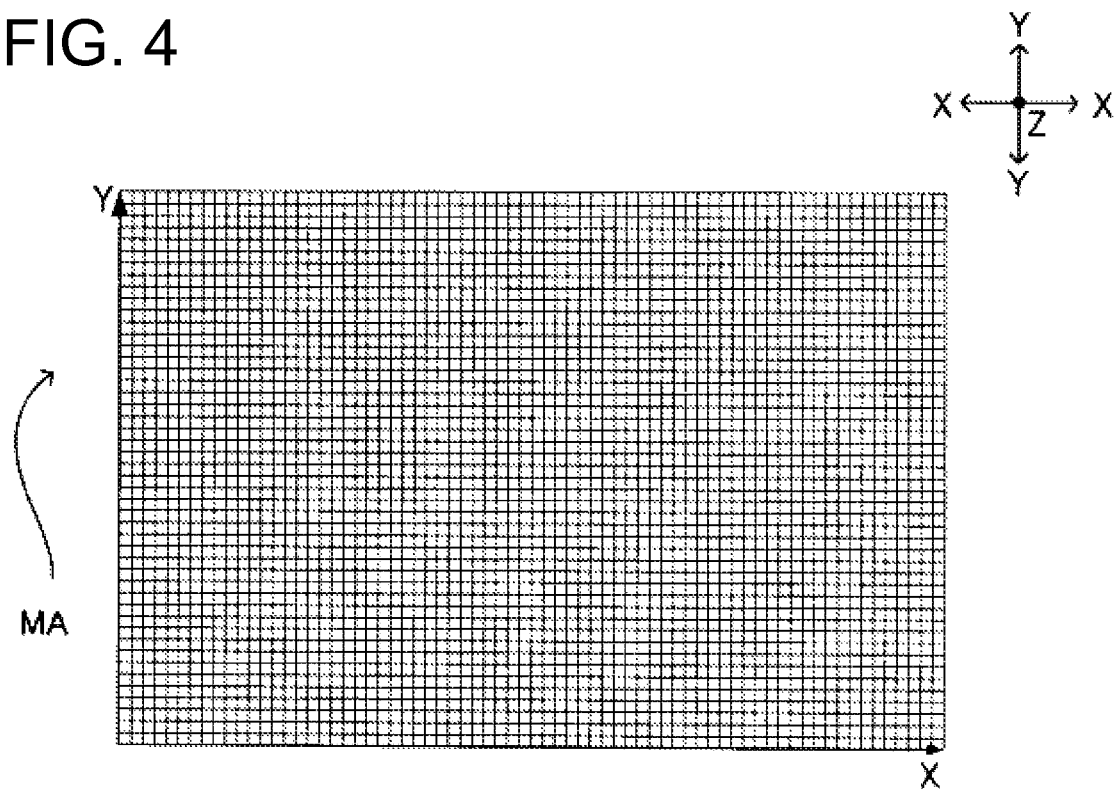
FIG. 4 is a plan view of a coordinate map area.

Here, when a region where an area capable of receiving light in a light receiving element 26 at the line sensor 25B overlaps with an area capable of receiving light in a light receiving element 26 at the line sensor 25A is defined as one grid unit, the coordinate map area MA is an area filled with these small grid units, as shown in FIG. 4 (in other words, the coordinate map area MA having small grid units in a matrix is formed). Because such a coordinate map area MA is formed, the position of a finger or the like on this coordinate map area MA can be identified.

The sensing management unit 35 controls the LEDs 23 through the LED driver 32, and determines a light reception state at line sensors 25 through the line sensors 25. Specifically, the sensing management unit 35 controls light emission timings, light emission time and the like of the LEDs 23 by control signals, and measures the light intensity distribution in the coordinate map area MA in accordance with the values of light reception signals (signal intensity) of the line sensors 25.

Figure 5:
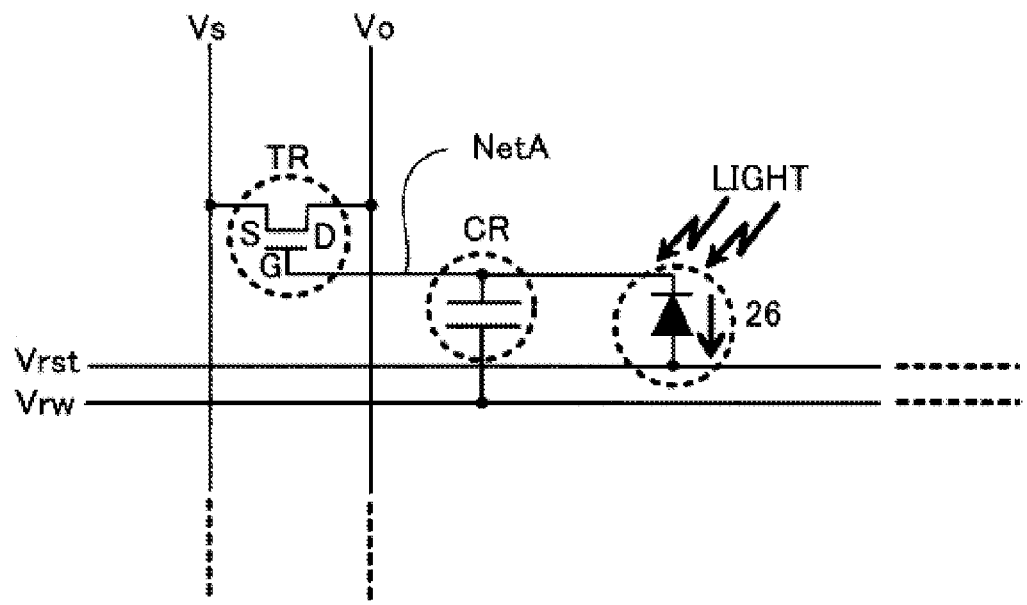
FIG. 5 is a circuit diagram of a sensor circuit.
Figure 6:
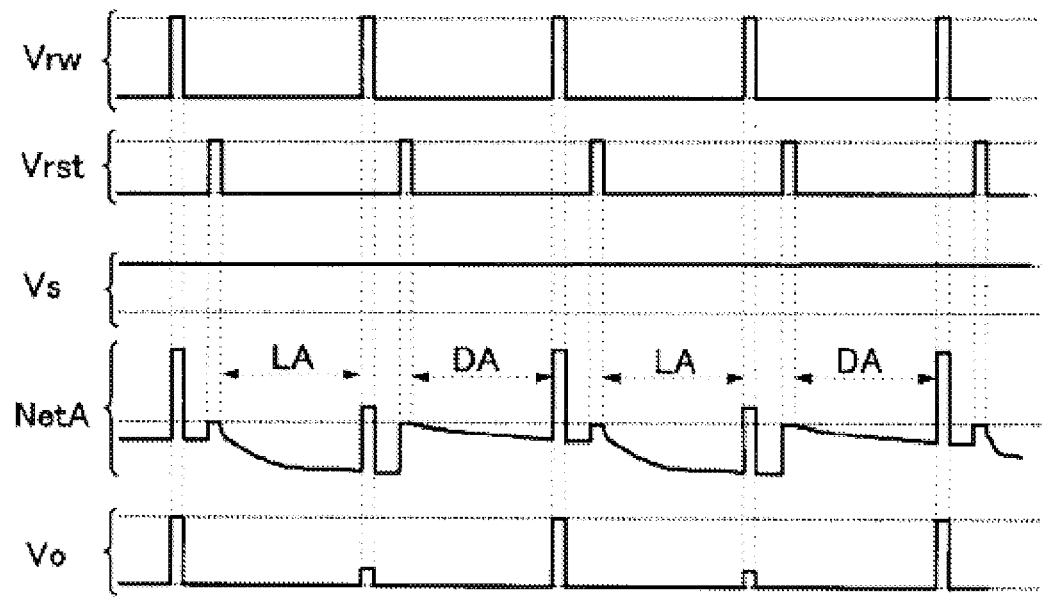
FIG. 6 is a timing chart of the sensor circuit.

Specifically, the sensing management unit 35 controls a current flow (voltage application) at a circuit (sensor circuit) shown in FIG. 5 to determine the light intensity distribution in the coordinate map area MA. Here, the reference characters in FIG. 5 are as follows. The following members are mounted in the mounting substrate 27. FIG. 6 shows a timing chart of the sensor circuit.

TR: Transistor
CR: Capacitor
Vrw: Reading wire
Vrst: Reset wire for light receiving elements 26
Vs: Voltage application wire for transistor
NetA: Wire for connecting capacitor and transistor
Vo: Output wire for light receiving elements 26

First, the sensing management unit 35 applies a forward bias to the light receiving element 26 through the reset wire Vrst to set (reset) a voltage at the wire NetA to the initial state. When the light receiving element 26 receives light, it generates a reverse bias current in accordance with the amount of light received. This reverse bias current (current) discharges an electric charge at the capacitor CR connected to the wire Net A. As a result, as shown in periods "LA" in FIG. 6, a voltage at the wire NetA decreases (here, when the light receiving element 26 does not receive light, the capacitor CR maintains an electric charge, and a voltage at the wire NetA does not decrease much as shown in periods "DA" in FIG. 6).

Here, when the sensing management unit 35 applies a voltage through the reading wire Vrw, a voltage at the wire NetA increases and a gate electrode G of the transistor TR opens. As a result, a voltage according to the voltage applied to the voltage application wire Vs is outputted from the output wire Vo (in other words, an output voltage that is outputted from the output wire Vo changes due to a difference in voltage at the wire NetA).

To be more specific, an output voltage when light entered the light receiving element 26 is lower than an output voltage when light did not enter the light receiving element 26 (that is, the output voltage when light did not enter the light receiving element 26 is higher than the output voltage when light entered the light receiving element 26). Based on such a difference in the output voltage, the sensing management unit 35 identifies which light receiving element 26 received light and which light receiving element 26 did not receive light at the line sensors 25 (here, data indicating an on/off state of the light receiving elements 26 at the line sensors 25 is referred to as light reception data).

The position identification unit 36 identifies the position of an object on the coordinate map area MA obtained from the memory 34 in accordance with light reception data of the line sensors 25 sent from the sensing management unit 35. Specifically, the position identification unit 36 identifies the following area as the position of an object on the coordinate map area MA: small grid units defined by an area of the light receiving elements 26 at the line sensor 25A that are capable of receiving light but did not receive light, and an area of the light receiving elements 26 at the line sensor 25B that are capable of receiving light but did not receive light.

Here, a semiconductor (photoelectric conversion body) included in the light receiving element 26, and the phosphor 11 that covers the light receiving element 26 of the line sensor 25 are described in detail with reference to FIG. 7.

Figure 7:
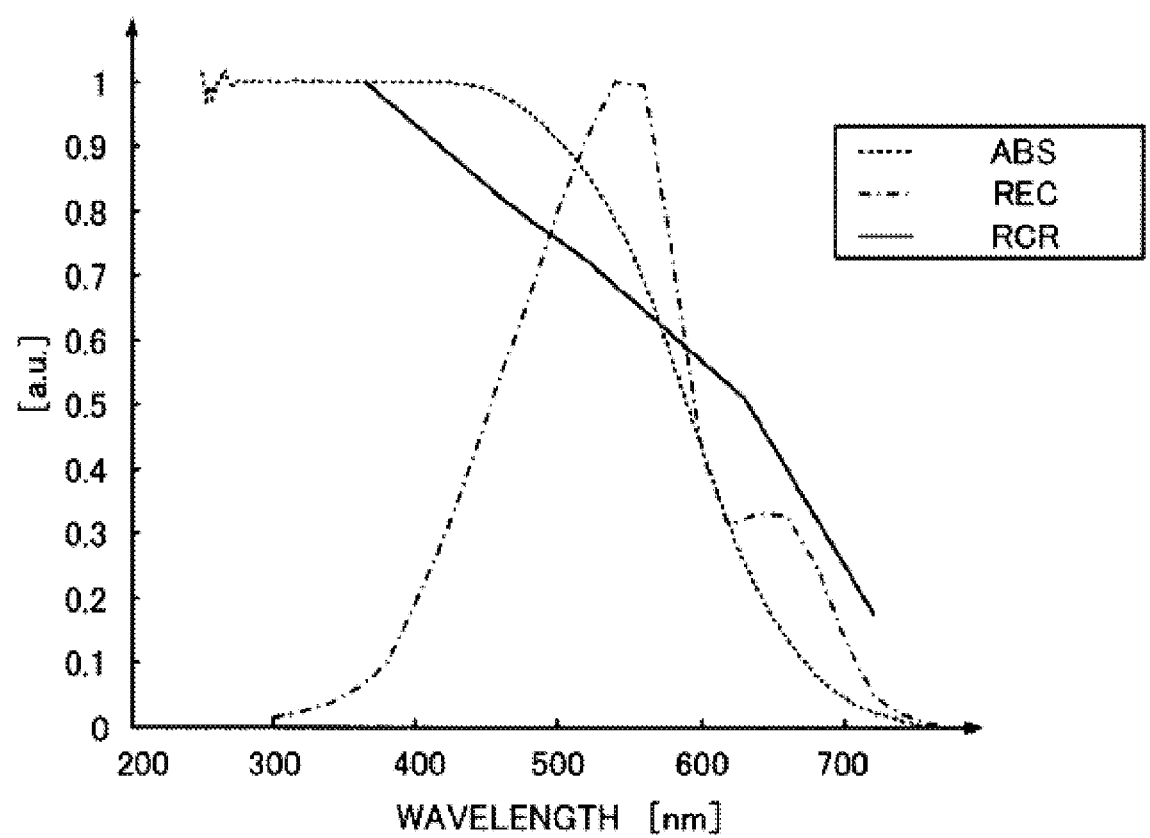
FIG. 7 is a graph showing the absorbance ABS of a semiconductor film, the current generation rate REC, which is a normalized value of a reverse bias current generated at each wavelength of light entering this semiconductor film, and the characteristic change rate RCR of the semiconductor film.

FIG. 7 is a graph showing the light absorbance ABS of a single-layered semiconductor film made of amorphous silicon (a-Si) having the film thickness of 170 nm (in other words, the light absorption rate of the semiconductor), the current generation rate REC, which is a normalized reverse bias current generated at each wavelength of light entering the semiconductor film, and the characteristic change rate RCR of the semiconductor film.

A graph line of the current generation rate REC in FIG. 7 uses the largest value of the reverse bias current as a reference (that is, "1"), and the wavelength that generates this largest reverse bias current is approximately 540 nm. The characteristic change rate RCR is a value indicated by the formula (1) below. In FIG. 7, the characteristic change rate RCR is a normalized graph line using the characteristic change rate V at a wavelength of 365 nm as the basis (that is, "1").

$$RCR = 1 - Ce/Cs \quad \text{Formula (1)}$$

where,

Cs: a reverse bias current that the semiconductor initially generates when it receives light Ce: a reverse bias current that the semiconductor generates after it has received light of a certain wavelength for a prescribed period of time (an appropriate period of time longer than a certain length of time)

RCR: characteristic change rate

First, it is understood from the absorbance ABS in FIG. 7 that the semiconductor absorbs ultraviolet light in a shorter wavelength range (approximately 300 to 400 nm) efficiently. However, while the semiconductor film absorbs ultraviolet light (UV light) efficiently, it does not generate a large amount of a reverse bias current. It is understood from the graph line of the current generation rate REC that the semiconductor film generates the largest reverse bias current when light of a wavelength of approximately 540 nm is received.

However, when the semiconductor film receives light of the wavelength of approximately 540 nm at which the semiconductor film generates the largest reverse bias current, the characteristic change rate RCR is approximately 0.7, which is relatively high. In other words, the semiconductor (i.e., the light receiving element 26) generates the largest reverse bias current immediately after receiving light of the wavelength of approximately 540 nm (first wavelength), but it cannot continue generating the largest reverse bias current after that (the semiconductor film cannot generate the largest reverse bias current after a prescribed time of approximately 20000 hours has passed, for example).

When the characteristic change rate RCR is relatively high as described above, light detection of the light receiving elements 26 and thus light detection of the line sensors 25 are not guaranteed over a long period of time, for example (that is, the operating life is short). Specifically, a reverse bias current does not flow in the position detection system PM that has been used over a long period of time (that is, a reverse bias current does not flow regardless of the presence of an object on the coordinate map area MA), and a malfunction occurs.

For this reason, it is preferable that the light receiving element 26 using such a semiconductor have a relatively low characteristic change rate RCR. For example, light in a wavelength range of 600 nm and longer and 700 nm and shorter (second wavelength) is desirable because the characteristic change rate RCR becomes 0.5 or less.

Therefore, it is preferable that the position detection system PM satisfy the followings. First, in the position detection system PM, phosphors 11 that can excite invisible light (UV light), which is light emitted from the LEDs 23, are arranged in light paths lying between the LEDs 23 and the light-receiving elements 26.

This way, the phosphors 11 can convert invisible light of the LEDs 23 into light of a wavelength suitable for the light receiving elements 26, and therefore, light for detecting the position of an object is not visible to a user. Moreover, the phosphors 11 that received invisible light emit visible light by fluorescence, and therefore, it is possible to use the line sensors 25 that cannot function well for invisible light. In other words, there will be more flexibility in selection of the line sensors 25.

Further, such a phosphor 11 is formed by drying a fluorescent solution applied to cover the light receiving element 26 on the mounting substrate 27, or formed by vapor depositing particles of the phosphor 11 to the light receiving element through a metal mask, for example.

This phosphor 11 fluoresces, in response to invisible light received, at light of a second wavelength (a wavelength of approximately 600 nm and longer and 700 nm and shorter, for example) that is different from a first wavelength (a wavelength of approximately 540 nm, for example) that causes the semiconductor included in the light receiving element 26 to generate the largest reverse bias current when light is received. The semiconductor included in the light receiving element 26 satisfies the following condition formulas A to C.

$$RCR1 = 1 - Ce1/Cs1 \quad \text{Condition formula A}$$

$$RCR2 = 1 - Ce2/Cs2 \quad \text{Condition formula B}$$

$$RCR1 > RCR2 \quad \text{Condition formula C}$$

where,

Cs1: a reverse bias current that the semiconductor initially generates when it receives light of the first wavelength Ce1: a reverse bias current that the semiconductor generates after it has received light of the first wavelength for a prescribed period of time RCR1: a characteristic change rate of the semiconductor calculated using Cs1 and Ce1 when the semiconductor receives light of the first wavelength Cs2: a reverse bias current that the semiconductor initially generates when it receives light of the second wavelength Ce2: a reverse bias current that the semiconductor generates after it has received light of the second wavelength for a prescribed period of time RCR2: a characteristic change rate of the semiconductor calculated using Cs2 and Ce2 when the semiconductor receives light of the second wavelength In such a position detection system PM, even after it is used over a long period of time, the light receiving elements 26 (an embedded semiconductor to be more specific) included in the line sensors 25 can generate a reverse bias current with certainty in response to received light. Therefore, the operating life of the line sensors 25 is increased, and thus the operating life of the position detection system PM is also increased (that is, the position detection system PM can maintain a high level of position detection accuracy over a long period of time).

Moreover, the light receiving elements 26 do not receive ultraviolet light, which has a relatively low current generation rate REC, but receive infrared light, which has a relatively high current generation rate REC. Therefore, it is not necessary to excessively increase a current supplied to the LEDs 23, and as a result, the power consumption of the position detection system PM can be reduced.

In the position detection system PM described above, the LEDs 23 emit ultraviolet light, and the phosphor 11 was a red phosphor that receives ultraviolet light to fluoresce red light. This red phosphor has various kinds.

For example, there are red phosphors including the following base materials (sulfide, sodium sulfide) (here, the base materials include Eu as the light emitting center).

Sulfide: $Sr_{1-x}Ba_xS$
Sulfate: $Sr_{1-x}Ba_xSO_4$
("x" in the composition formula satisfies $0 \leq x \leq 1$)

A red phosphor represented by the composition formula below is also an example.

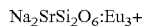

$Na_2SrSi_2O_6:Eu_3+$

A semiconductor included in the light receiving element 26 suitable for the red phosphors described above is a semiconductor including amorphous silicon, however, it is not limited to this, and a semiconductor including polysilicon (p-Si) may also be used, for example (in other words, there are various kinds of semiconductors).

In the position detection system PM, the line sensor 25 includes the light receiving elements 26 having a semiconductor, and the mounting substrate 27 in which wiring (sensor circuit) for extracting a reverse bias current generated by the semiconductor to the outside as a sensor output is arranged. Such a line sensor 25 has a plurality of light receiving elements 26 disposed on a single mounting substrate 27, which makes handling of the line sensor 25 easy. Furthermore, the phosphors 11 are also disposed on the mounting substrate 27 along with the semiconductor, which makes handling of the phosphors 11 easy as well.

It is preferable that the LED groups 22 be disposed on the protective substrate 21. This way, it is easy to handle the position detection system PM because a plurality of LEDs 23 are disposed on a single protective substrate 21.

The line sensors 25 are disposed on the protective substrate 21, and the LED groups 22 are also disposed on the protective substrate 21, and therefore, the principal members of this position detection system PM are gathered without being scattered. This makes it easy to handle the position detection system PM.

Figure 8:
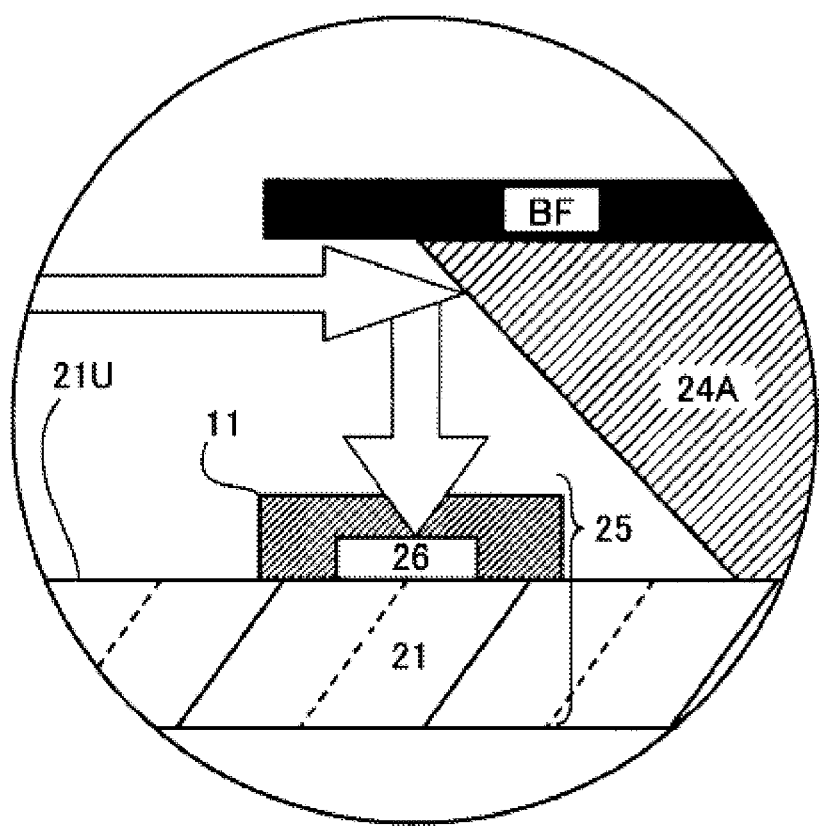
FIG. 8 is a partial enlarged view of a position detection system that is different from the position detection system shown in FIG. 3.

Further, the light receiving elements 26 and the mounting substrates 27 in the position detection system PM need not be mounted on the protective substrate 21, as shown in FIG. 3. For example, the light receiving elements 26 and various members of the mounting substrate 27 (a transistor TR, a capacitor CR, and a wiring such as various wires (that is, a sensor circuit)) may be mounted on the protective substrate 21 of the position detection system PM, as shown in FIG. 8.

This way, the protective substrate 21 also serves as the line sensor 25 (that is, because the light receiving elements 26 and wiring (sensor circuit) are disposed on the protective substrate 21, the protective substrate 21 also serves as the line sensor 25). Therefore, the position detection system PM of FIG. 8 can have a smaller number of substrates as compared to the position detection system PM of FIG. 3. Accordingly, the cost of this position detection system PM is also reduced.

Figure 9:
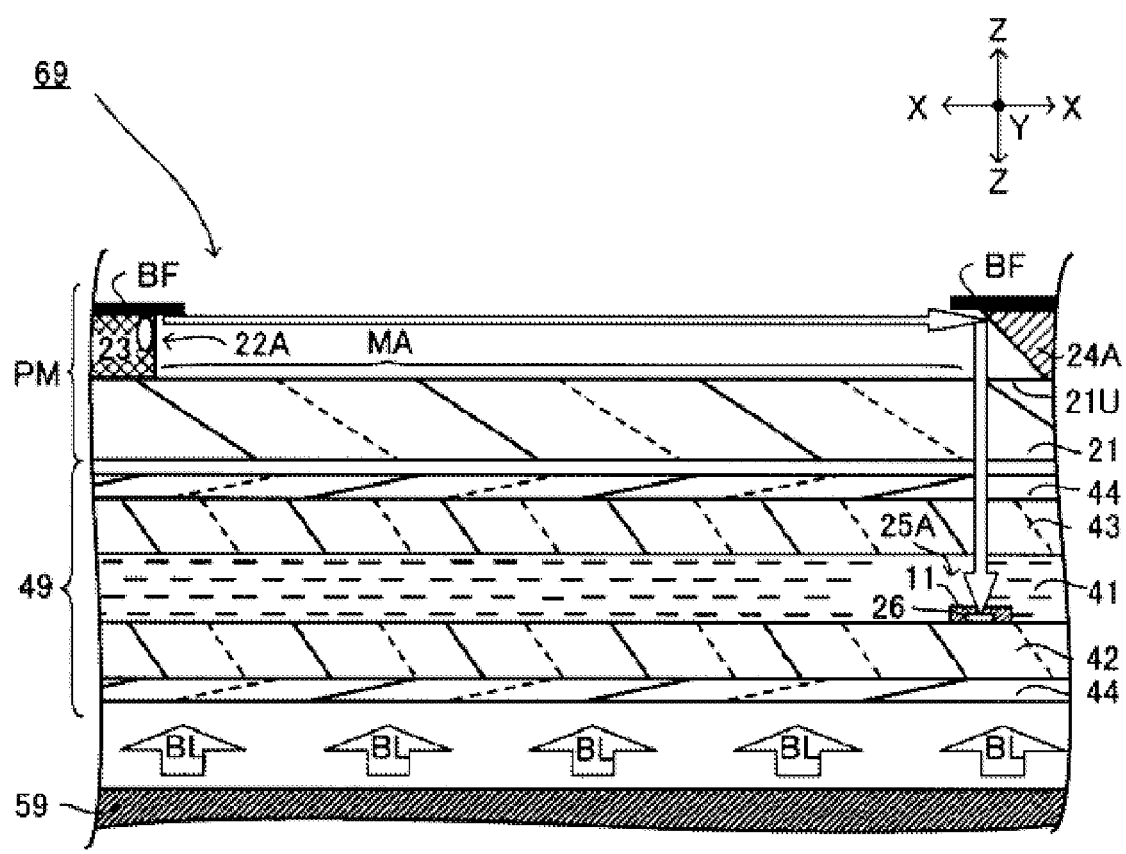
FIG. 9 is a partial cross-sectional view of a liquid crystal display device provided with a position detection system that is different from the position detection system shown in FIG. 1.

Moreover, when the position detection system PM is provided in the liquid crystal display panel 49, the line sensors 25 may be mounted on the active matrix substrate 42 as shown in FIG. 9 (in other words, the light receiving elements 26 and wiring (sensor circuit) are disposed on the active matrix substrate 42 included in the liquid crystal display panel 49, and therefore, the active matrix substrate 42 also serves as the line sensors 25).

Such a liquid crystal display panel 49 can also have a smaller number of substrates as compared to the position detection system PM of FIG. 3 (here, the number of substrates can also be reduced in a similar way when the opposite substrate 43 serves as the sensor substrate). Therefore, it is possible to reduce the cost of this position detection system PM and thus the cost of the liquid crystal display panel (touch panel) 49.

Manufacturing efficiency is also improved because the light receiving elements 26 as well as a sensor circuit (see FIG. 5) required for operating the light receiving elements 26 are formed on the active matrix substrate 42 along with switching elements for controlling the liquid crystal.

Figure 10:
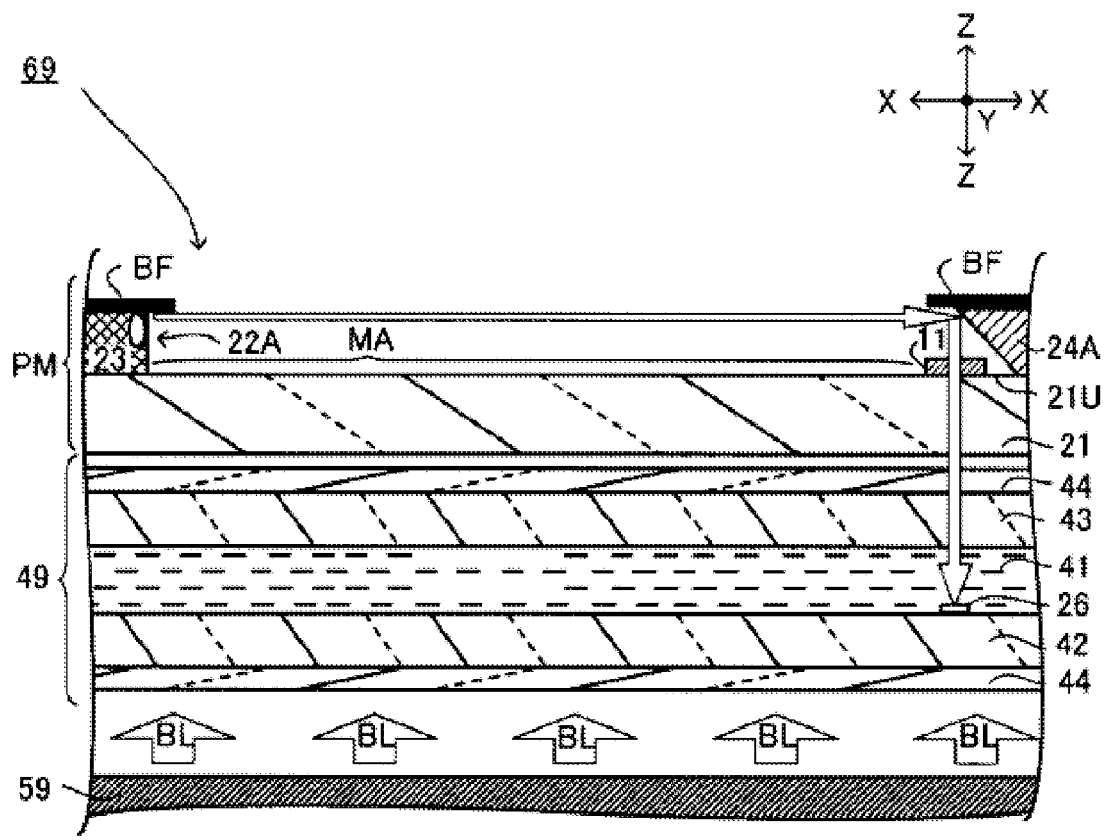
FIG. 10 is a partial cross-sectional view of a liquid crystal display device provided with a position detection system that is different from the position detection systems shown in FIGS. 1 and 9.

In the description above, the phosphor 11 was formed closely attached to the light receiving element 26 (see FIGS. 3, 8 and 9). However, the phosphor 11 need not be attached closely to the light receiving element 26. For example, as shown in FIG. 10, the phosphor 11 may be formed on the protective substrate 21, and the light receiving elements 26 and the sensor circuit required for operating the light receiving elements 26 may be formed on the active matrix substrate 42 (here, the phosphor 11 can be disposed on the protective substrate 21 by applying and drying a fluorescent solution or by vapor-depositing the same as described above).

This way, although the position of the phosphors 11 and the position of the light receiving elements 26 need to be matched (aligned), the number of substrates can be reduced as described above, and therefore, the cost of the position detection system PM and thus the cost of the liquid crystal display panel 49 can also be reduced (in contrast, the phosphors 11 are closely attached to the light receiving elements 26 shown in FIGS. 3, 8 and 9, which eliminates a necessity of alignment, and moreover the phosphors 11 are formed when the light receiving elements 26 are mounted, and therefore, the manufacturing efficiency becomes high).

Furthermore, only the phosphors 11 need to be formed on the protective substrate 21 by vapor deposition or the like, and the sensor circuit becomes unnecessary on the protective substrate 21. Accordingly, the protective substrate 21 does not need to be a substrate suitable for forming the sensor circuit. This increases selection for the material of the protective substrate 21.

Other Embodiments

The present invention is not limited to the embodiments described above, and various modifications can be made within the scope of the present invention.

Figure 12:
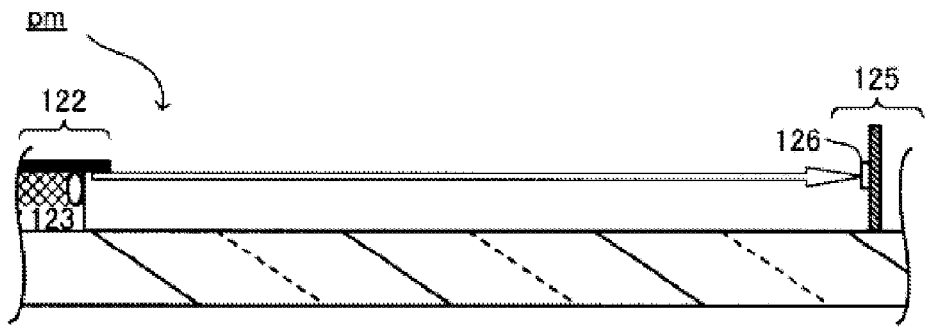
FIG. 12 is a partial cross-sectional view of a conventional position detection system.
Figure 13:
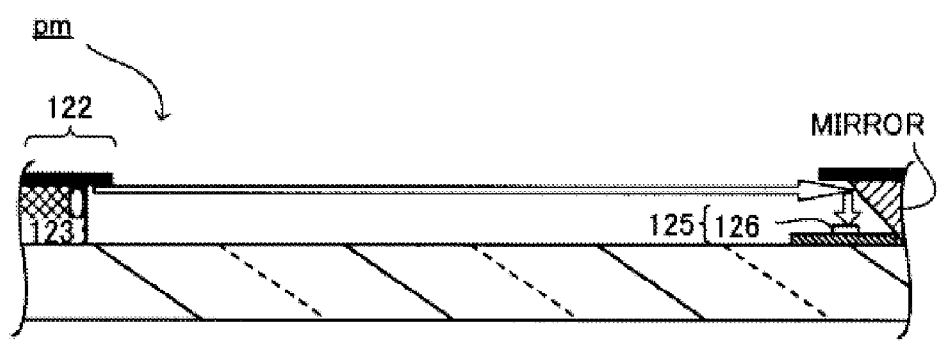
FIG. 13 is a partial cross-sectional view of a conventional position detection system that is different from the position detection system shown in FIG. 12.

For example, in the above-mentioned position detection system PM, the reflective mirrors 24 are attached to the protective substrate 21, but these reflective mirrors 24 are not mandatory. For example, the reflective mirrors 24 may be omitted, and light from the LEDs 23 may directly enter the line sensors 25 (see FIG. 12, for example).

However, in such a position detection system PM, a substrate surface of the mounting substrate of the line sensors 125 is not parallel to the substrate surface 21U of the protective substrate 21, but it is erected (here, a light receiving surface of the light receiving elements 126 is parallel to the mounting surface of the mounting substrate). As a result, a portion protruding from the substrate surface 21U of the protective substrate 21 is generated (in other words, a short side (a length of the mounting substrate in a direction perpendicular to the direction in which the light receiving elements 26 are arranged) of the mounting substrate sticks out from the substrate surface 21U of the protective substrate 21), and the thickness of the position detection system PM and thus the thickness of the liquid crystal display panel 49 is increased.

In contrast, in the position detection system PM using the reflective mirrors 24 as shown in FIG. 3 and the like, that is, when the reflective mirrors 24 that refract light from the LEDs 23 and guide the light to the light receiving elements 26 (i.e., to the line sensors 25) is disposed on the protective substrate 21, the line sensors 25 can have the mounting substrates 27 disposed along the surface direction of a substrate surface (the substrate surface 21U, for example) of the protective substrate 21. As a result, the thickness of the position detection system is reduced.

Figure 11:
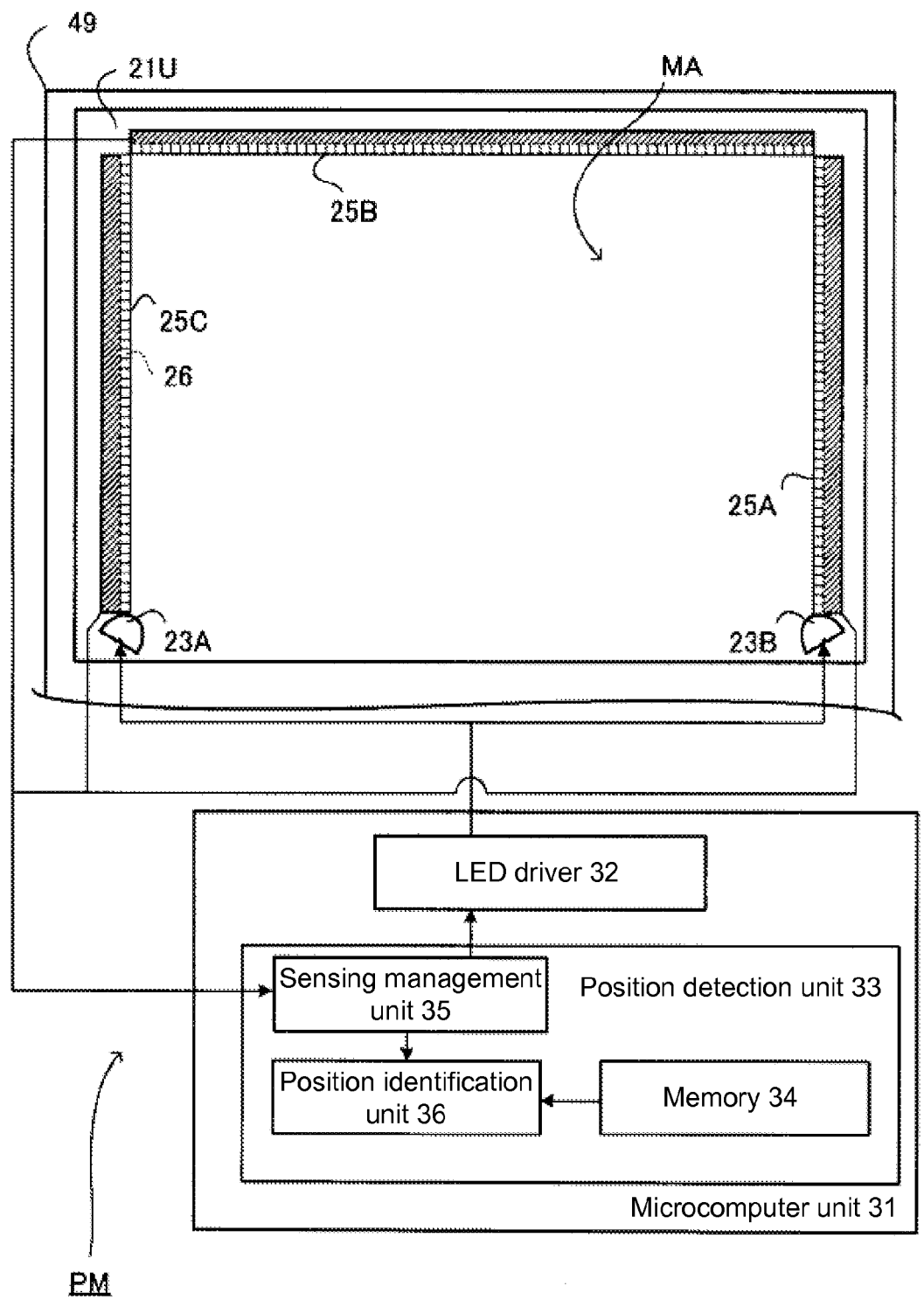
FIG. 11 is an explanatory view showing both a plan view of a position detection system, and a block diagram of a microcomputer unit required for controlling the position detection system.

Moreover, in the above-mentioned embodiments, the line sensors 25 are arranged in an L-shape, and the LEDs 23 are also arranged in an L-shape, as shown in FIG. 2. However, the arrangement is not limited to such. For example, as shown in FIG. 11, the line sensors 25 (25A to 25C) may be arranged in a U-shape ("U"), and the LEDs 23 (23A and 23B) may be disposed at respective ends of the U-shape.

Specifically, the LED 23A and the LED 23B are arranged so as to have a distance therebetween and to face the line sensor 25. Light emitted from the LEDs 23A and 23B (light source light) travels along the sheet surface of the protective sheet 21, and travels toward a coordinate map area MA enclosed by the line sensors 25A to 25C. To be more specific, the LED 23A emits light toward a connecting point of the line sensor 25A and the line sensor 25B, and the LED 23B emits light toward a connecting point of the line sensor 25B and the line sensor 25C.

This way, the shadows of an object generated when the LED 23A and the LED 23B separately light up are recognized by the line sensors 25. Then, the sensing management unit 35 defines a plurality of connecting lines that connect respective LEDs 23 to the shadows created by each of the LEDs 23. After that, the position identification unit 36 obtains intersections of the plurality of connecting lines to identify the position of the object (that is, the position of the object is identified using a triangulation method).

DESCRIPTION OF REFERENCE CHARACTERS 11 phosphor
21 protective substrate (base substrate, light receiving sensor)
22 LED group (light source group)
23 LED (light source)
24 reflective mirror (refractive optical element)
25 line sensor (light receiving sensor)
26 light receiving element
27 mounting substrate (sensor substrate)
31 microcomputer unit
32 LED driver
33 position detection unit
PM position detection system
41 liquid crystal
42 active matrix substrate (panel substrate, light receiving sensor)
43 opposite substrate
49 liquid crystal display panel (display panel)
69 liquid crystal display device (display device)

The invention claimed is:

1. A position detection system that uses a shadow of an object to detect a position of the object, comprising:
 a light source group including light sources that emit light onto said object;
 a light receiving sensor in which light receiving elements that measure a light intensity distribution of said light, which has been changed by a shadow generated by said object, are arranged; and
 a phosphor that fluoresces in response to invisible light, which is said light arranged on an optical path of said light of said light source to said light receiving element,
 wherein said phosphor emits by fluorescence, in response to the invisible light received, light of a second wavelength that is different from light of a first wavelength at which a photoelectric conversion body included in said light receiving element generates a largest reverse bias current upon light reception, and
 wherein said photoelectric conversion body satisfies condition formulas A to C below:

$$RCR1 = 1 - Ce1/Cs1 \quad \text{Condition formula A}$$

$$RCR2 = 1 - Ce2/Cs2 \quad \text{Condition formula B}$$

$$RCR1 > RCR2 \quad \text{Condition formula C}$$

where,
 Cs1: a reverse bias current that the photoelectric conversion body initially generates upon receipt of light of the first wavelength
 Ce1: a reverse bias current that the photoelectric conversion body generates after having received the light of the first wavelength for a prescribed period of time
 RCR1: a characteristic change rate of the photoelectric conversion body calculated using Cs1 and Ce1 when the photoelectric conversion body receives light of the first wavelength
 Cs2: a reverse bias current that the photoelectric conversion body initially generates upon receipt of light of the second wavelength
 Ce2: a reverse bias current that the photoelectric conversion body generates after having received the light of the second wavelength for a prescribed period of time
 RCR2: a characteristic change rate of the photoelectric conversion body calculated using Cs2 and Ce2 when the photoelectric conversion body receives light of the second wavelength.

2. The position detection system according to claim 1, wherein said light source emits ultraviolet light,
 wherein said phosphor is a red phosphor that emits red light by fluorescence in response to said ultraviolet light, and
 wherein said photoelectric conversion body included in said light receiving element is a semiconductor including amorphous silicon.

3. The position detection system according to claim 1, wherein said light receiving sensor includes said light receiving element having said photoelectric conversion body, and a sensor substrate having a circuit for extracting a reverse bias current generated by said photoelectric conversion body to an exterior as a sensor output.

4. The position detection system according to claim 3, wherein said light source group is disposed on a base substrate that serves as a base.

5. The position detection system according to claim 4, wherein said base substrate serves as said light receiving sensor by having said light receiving element and said circuit disposed on said base substrate.

6. The position detection system according to claim 3, wherein said phosphor is disposed on said sensor substrate along with said photoelectric conversion body, and covers said photoelectric conversion body.

7. The position detection system according to claim 1, further comprising
a refractive optical element that refracts light from said light source and guides the light to said light receiving element,
wherein the refractive optical element is disposed on a base substrate.

8. A display panel provided with the position detection system according to claim 7,
wherein said light receiving sensor includes said light receiving element having said photoelectric conversion body, and a sensor substrate having a circuit for extracting a reverse bias current generated by said photoelectric conversion body to an exterior as a sensor output, and
wherein said light receiving element and said circuit are disposed on a panel substrate included in said display panel so that said panel substrate also serves as said light receiving sensor.

9. The display panel according to claim 8, wherein said phosphor is disposed on said panel substrate along with said photoelectric conversion body, and covers said photoelectric conversion body.

10. The display panel according to claim 8, wherein said phosphor is disposed on said base substrate.

11. A display panel provided with the position detection system according to claim 1.

12. A display device provided with the display panel according to claim 11.

* * * * *